United States Patent
Kim et al.

(10) Patent No.: US 9,052,107 B2
(45) Date of Patent: Jun. 9, 2015

(54) LEAN-RICH BURNER

(75) Inventors: Sang-Kook Kim, Gyeonggi-Do (KR); Jae-Myung Joo, Seoul (KR)

(73) Assignee: Kyungdong Navien Co., Ltd., Pyeongtaek, Gyeonggi-do (KR)

( * ) Notice: Subject to any disclaimer, the term of this patent is extended or adjusted under 35 U.S.C. 154(b) by 703 days.

(21) Appl. No.: 13/386,408

(22) PCT Filed: Jul. 21, 2010

(86) PCT No.: PCT/KR2010/004773
§ 371 (c)(1),
(2), (4) Date: Mar. 22, 2012

(87) PCT Pub. No.: WO2011/010867
PCT Pub. Date: Jan. 27, 2011

(65) Prior Publication Data
US 2012/0178033 A1   Jul. 12, 2012

(30) Foreign Application Priority Data

Jul. 22, 2009  (KR) .................. 10-2009-0066738

(51) Int. Cl.
*F23D 14/10*     (2006.01)
*F23D 14/04*     (2006.01)
*F23D 14/58*     (2006.01)

(52) U.S. Cl.
CPC .............. *F23D 14/10* (2013.01); *F23D 14/045* (2013.01); *F23D 14/58* (2013.01)

(58) Field of Classification Search
CPC ....... F23D 14/04; F23D 14/045; F23D 14/58; F23D 14/10; F23D 14/26; F23D 14/586; F23D 14/62; F23D 14/64; F23D 14/70; F23D 14/74; F23D 2209/20
USPC ........ 431/278, 285, 328, 354, 355; 126/92 R, 126/92 AC
See application file for complete search history.

(56) References Cited

U.S. PATENT DOCUMENTS 6,786,717 B2 *   9/2004   Shimazu et al. .............. 431/354

FOREIGN PATENT DOCUMENTS

KR        10-0883796 B1      2/2009

* cited by examiner

*Primary Examiner* — Alfred Basichas
(74) *Attorney, Agent, or Firm* — Mintz Levin Cohn Ferris Glovsky and Popeo, P.C.; Kongsik Kim

(57) ABSTRACT

A lean-rich burner is provided, in which an air-rich flame and a fuel-rich flame are formed by a simple structure, thereby reducing the emission of noxious gas and enabling stable combustion. The lean-rich burner includes: a main flame part (110) for burning a fuel-rich mixture in which primary air, which is some of air supplied by a blower, and fuel are mixed; auxiliary flame parts (120) installed on left and right sides of the main flame part (110) to burn an air-rich mixture; a main mixture channel (130) for supplying the fuel-rich mixture to the main flame part (110); a mixture distribution hole (140) formed along the main mixture channel (130) to supply some of the mixture flowing along the main mixture channel (130) to the auxiliary flame parts (120); and a Venturi part (150) having a Venturi structure in which secondary air inflow holes (151) are formed to mix secondary air, which is some of the air supplied by the blower, with the mixture introduced through the mixture distribution hole (140).

3 Claims, 5 Drawing Sheets

US 9,052,107 B2

LEAN-RICH BURNER

CROSS-REFERENCES TO RELATED APPLICATIONS

This application is a U.S. national phase application, pursuant to 35 U.S.C. §371, of PCT/KR2010/004773, filed Jul. 21, 2010, designating the United States, which claims priority to Korean Application No. 10-2009-0066738, filed Jul. 22, 2009. The entire contents of the aforementioned patent applications are incorporated herein by this reference.

TECHNICAL FIELD

The present invention relates to a lean-rich burner, and more particularly, to a lean-rich burner in which fuel-rich combustion and air-rich combustion are carried out at the same time.

BACKGROUND ART

Most household gas boilers employ a semi Bunsen burner due to stable inflammability. This semi Bunsen burner mixes some air (primary air) supplied from a blower with gas fuel in advance and supplies the mixture to a combustion unit to form a flame. The semi Bunsen burner supplies the rest of the air (secondary air) supplied from the blower to a flame forming part, thereby inducing complete combustion.

To prevent harmful emissions (e.g. CO) from being excessively discharged from such a burner, the output of the burner is generally required to be less than 2,000 kcal/h. In this case, when the output per burner unit is designed to be low, many burner units should be installed to meet the maximum output required from the boiler. As such, the overall volume of the boiler is increased.

To overcome this problem, a premix burner characterized by a small volume, high load, and low NOx has been used. However, the premix burner is difficulty to control because the range of an air ratio for stable combustion is narrow.

A high-load burner based on a concept of a lean-rich burner adopting advantages of the aforementioned burners has been developed and used. The lean-rich burner is designed so that flame parts in which excessive air is burned on one side and flame parts in which excessive gas is burned on the other side are alternately provided. In the burner having this structure, a mixed gas ejected from the two types of flame parts participates in mutual combustion, so that stable high-load combustion and low NOx combustion can be carried out by the burner having a small volume.

Most lean-rich burners are designed in the form of a dual gas pipe (in which one gas pipe is used for an air-rich mixture and the other gas pipe is used for a gas-rich mixture), and thus have a complicated structure and a large number of parts, which leads to an increase in manufacturing cost.

Meanwhile, a gas burner that alternately forms a main flame and an auxiliary flame is disclosed in Korean Utility Model Application Publication No. 1992-1735. This gas burner has the same structure as a burner in which a mixture of the same air ratio is divided into and burnt in two flame parts and one flame part is widened in a combustion area, rather than the concept of a lean-rich burner that enables stable combustion on the basis of different air ratios of the main flame and the auxiliary flame. Thus, it is impossible to expect a correlative reaction of an air-rich flame and a gas-rich flame as in the lean-rich burner.

SUMMARY OF THE DISCLOSURE

Technical Problem

Accordingly, the present invention has been made keeping in mind the above problems occurring in the related art, and an objective of the present invention is to provide a lean-rich burner in which an air-rich flame and a fuel-rich flame are formed by a simple structure, thereby reducing the emission of noxious gas and simultaneously enabling stable combustion.

Another objective of the present invention is to provide a lean-rich burner capable of preventing an air-rich mixture from flowing to the side of a secondary air channel.

Still another objective of the present invention is to provide a lean-rich burner in which a fuel-rich mixture is capable of smoothly flowing to the side of auxiliary flame parts.

Yet another objective of the present invention is to provide a lean-rich burner capable of preventing the flashback of a flame in the event of low load.

Technical Solution

To accomplish the objective, one aspect of the present invention is to provide a lean-rich burner, which includes: a main flame part (110) for burning a fuel-rich mixture in which primary air, which is some of air supplied by a blower, and fuel are mixed; auxiliary flame parts (120) installed on left and right sides of the main flame part (110) to burn an air-rich mixture; a main mixture channel (130) for supplying the fuel-rich mixture to the main flame part (110); a mixture distribution hole (140) formed in the main mixture channel (130) to supply some of the mixture flowing along the main mixture channel (130) to the auxiliary flame parts (120); and a Venturi part (150) having a Venturi structure in which secondary air inflow holes (151) are formed to mix secondary air, which is some of the air supplied by the blower, with the mixture introduced through the mixture distribution hole (140).

Another aspect of the present invention is to provide a lean-rich burner, which includes: a main flame part (410) for burning an air-rich mixture; auxiliary flame parts (420) installed on left and right sides of the main flame part (410) to burn a fuel-rich mixture; a main mixture channel (430) for supplying the air-rich mixture to the main flame part (410); a mixture distribution hole (440) formed in the main mixture channel (430) to supply some of the mixture flowing along the main mixture channel (430) to the auxiliary flame parts (420); and a Venturi part (450) having a Venturi structure in which secondary air inflow holes (451) are formed to mix secondary air, which is some of air supplied by a blower, with the mixture flowing along the main mixture channel (430).

Advantageous Effects

According to the present invention, a Venturi structure connected with a secondary air channel is formed on the side of auxiliary flame parts, so that it is possible to realize a lean-rich burner in a simple structure. With this lean-rich structure, it is possible to reduce the emission of noxious gas and to achieve stable combustion.

Further, the Venturi structure introducing the secondary air is located just before the auxiliary flame parts, so that it is possible to prevent the flashback of a flame in the event of low load.

Further, a protrusion is formed around the mixture distribution hole formed in the main mixture channel through which the fuel-rich mixture flows, so that the mixture can be smoothly introduced toward the auxiliary flame parts.

In addition, an ejection channel of the mixture is constricted at the main flame part, so that it is possible to prevent the flashback of a flame in the event of low load.

DESCRIPTION OF MAJOR SYMBOL IN THE ABOVE FIGURES

Figure 1:
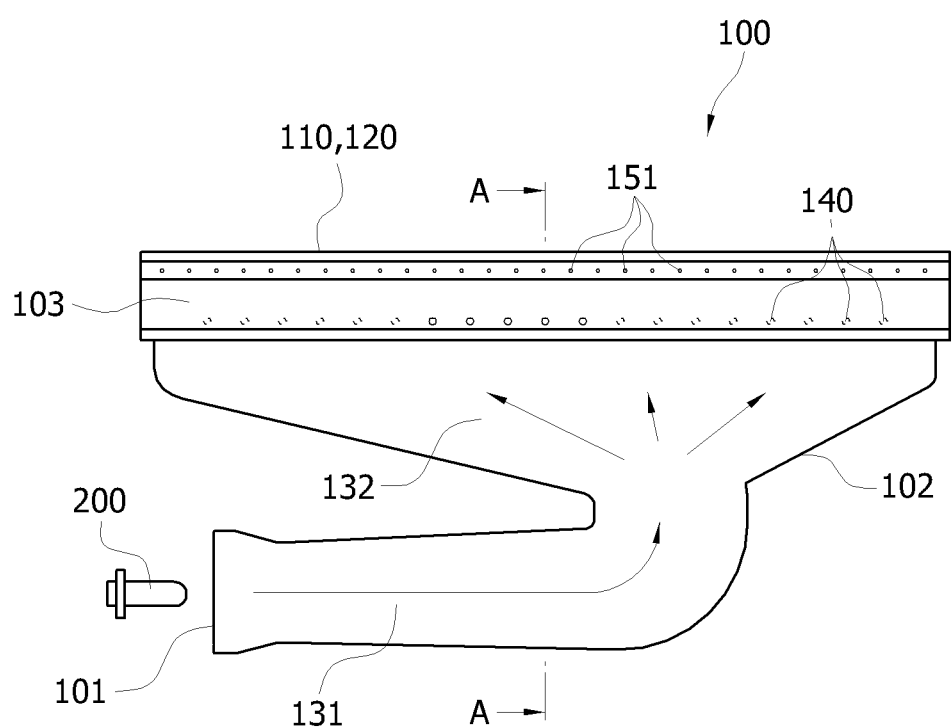
FIG. 1 is a front view showing a burner unit according to an embodiment of the present invention.

100: burner unit
101, 401: mixture inflow part
102, 402: main body
103, 403: outer plate
110, 410: main flame part
120, 420: auxiliary flame part
130, 430: main mixture channel
140, 440: mixture distribution hole
150, 450: Venturi part
151, 451: secondary air inflow hole
200: nozzle
300: air distribution plate

DETAILED DESCRIPTION OF EMBODIMENTS

Hereinafter, the construction and operation of exemplary embodiments of the present invention will be described in detail with reference to the accompanying drawings.

FIG. 1 is a front view showing a burner unit according to an embodiment of the present invention.

A lean-rich burner of the present invention is made up of a plurality of burner units 100 shown in FIG. 1.

Each burner unit 100 includes a main flame part 110 for burning a fuel-rich mixture, auxiliary flame parts 120 for burning an air-rich mixture, a main body 102 in which a channel of the fuel-rich mixture is provided, and an outer plate 103 providing a channel of the air-rich mixture between the outer plate and an outer face of an upper end of the main body 102.

A mixture inflow part 101, through which fuel gas and air are mixed and introduced, is formed on one side of a lower end of the main body 102. A nozzle 200, which injects the fuel gas, is installed adjacent to the mixture inflow part 101 so as to direct the inside of the mixture inflow part 101.

Some air (hereinafter referred to as "primary air") supplied from a blower (not shown) is mixed and introduced with the fuel gas by the mixture inflow part 101. The remaining air (hereinafter referred to as "secondary air") other than the primary air flows through a plurality of air holes 310 (see FIG. 2) of an air distribution plate 300 installed on a lower portion of the burner unit 100, and then flows along the outside of the main body of the burner unit 100 in an upward direction.

The outer plate 103 is provided with secondary air inflow holes 151 so as to allow the secondary air, which passes through the air holes 310 of the air distribution plate 300, to be introduced toward the channel through which the air-rich mixture flows.

Main mixture channels 130 (131, 132 and 133) through which the fuel-rich mixture flows are formed in the main body 102.

Figure 2:
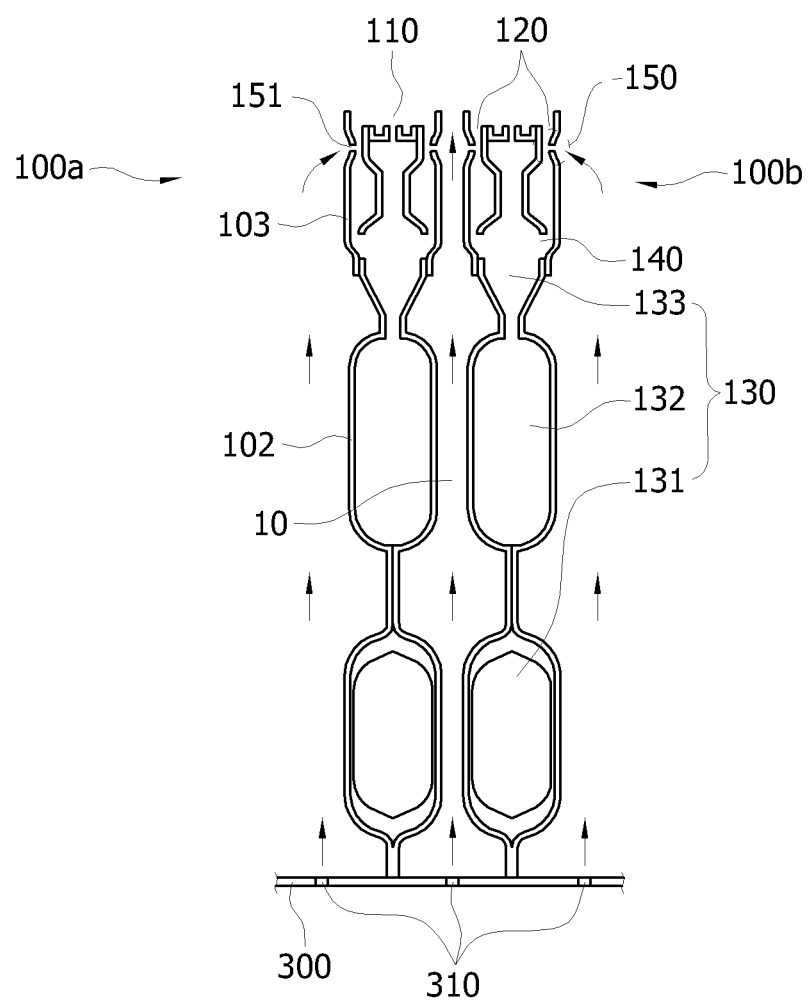
FIG. 2 is a cross-sectional view taken along line A-A of FIG. 1.

FIG. 2 is a cross-sectional view taken along line A-A of FIG. 1.

A plurality of burner units 100a and 100b are installed so as to be adjacent to each other, between which the secondary air channels 10, which are spaces in which the secondary air flows, are formed. The air distribution plate 300 is installed on the lower portions of the burner units 100a and 100b. The plurality of air holes 310 are perforated through the air distribution plate 300 so that the secondary air flows therethrough.

The primary air and the fuel gas, both of which are introduced through the mixture inflow part 101 are mixed while passing through the main mixture channels 131, 132 and 133, and then ejected through the main flame part 110 to form a rich flame that is produced by rich fuel.

In this case, some of the mixture of the primary air and the fuel gas is supplied to auxiliary flame parts (120) installed on left and right sides of the main flame part (110) via a mixture distribution hole 140. The mixture passing through the mixture distribution hole 140 is mixed with the secondary air flowing through the secondary air inflow holes 151 while passing through a Venturi part 150 having a Venturi structure, and thus becomes an air-rich mixture (i.e. a lean mixture) to be supplied to the auxiliary flame parts 120.

Here, the secondary air passes through the air holes 310 of the air distribution plate 300, flows along the outsides of the burner units 100a and 100b, and is introduced into the secondary air inflow holes 151 due to a pressure difference caused by the Venturi structure of the Venturi part 150.

The Venturi part 150 serves to introduce the secondary air, and to increase a flow rate of the mixture in the event of low load to prevent the flashback of the flame from taking place at the auxiliary flame parts 120.

Figure 3:
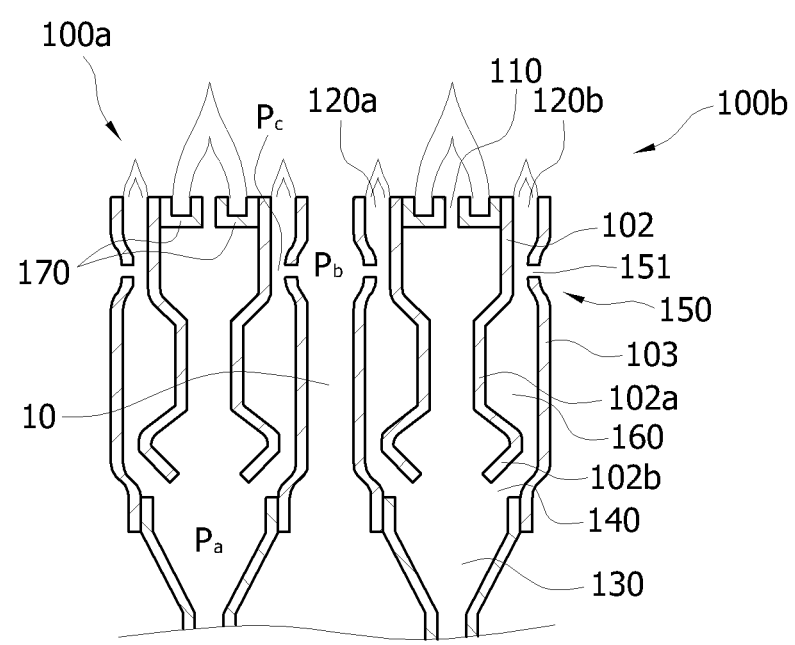
FIG. 3 is a partial enlarged view showing the burner unit of FIG. 2 in detail.

FIG. 3 is a partial enlarged view showing the burner unit of FIG. 2 in detail.

Each of the burner units 100a and 100b is provided with a main flame part 110 for burning the fuel-rich mixture on an upper side thereof, and auxiliary flame parts 120 for burning the air-rich mixture on the left and right sides of the main flame part 110.

The main flame part 110 is provided with channel constriction brackets 170 for constricting an ejection channel of the mixture. Each channel constriction bracket 170 is bent in an angled "C" shape, and is adapted to constrict the channel of the mixture and to guide a flow of the mixture. When the channel of the mixture is constricted in this way, the flow rate of the mixture is allowed to be rapid in the event of low load, so that it is possible to prevent the flashback of the flame.

The mixture distribution hole 140 for supplying some of the mixture to the auxiliary flame parts 120 is formed in the main mixture channel 130 that supplies the fuel-rich mixture to the main flame part 110.

The mixture distribution hole 140 is a hole formed by perforating the main body 102 located at an inner side of the outer plate 103. A protrusion 102b is formed above an edge of the mixture distribution hole 140. Since the flow rate of the mixture is nearly zero at an inner wall portion of the main body 102 in which the mixture flows, the flow of the mixture is smoothed by the protrusion 102b, so that the mixture can be smoothly supplied to the auxiliary flame parts 120. The protrusion 102b may be formed by burring.

The mixture passing through the mixture distribution hole 140 flows through an enlarged part 160. The enlarged part 160 is a space between an inwardly recessed body part 102a and the outer plate 103. Due to this enlarged part 160, a great pressure difference takes place at the Venturi part 150, so that it is possible to maximize a Venturi effect.

The mixture passing through the enlarged part 160 is mixed with the secondary air at the Venturi part 150, and then is supplied to the auxiliary flame parts 120. The Venturi part 150 has a Venturi structure in which the outer plate 130 is recessed in an inward direction. The secondary air inflow holes 151 are formed in the recessed part of the outer plate 130, and thus the secondary air, which is being raised along the outside of each of the burner units 100a and 100b due to the pressure difference taking place at the Venturi part 150, is introduced through the secondary air inflow holes 151.

Now, a pressure relation of the mixture will be described.

Among the symbols shown in FIG. 3, Pa represents a pressure of the mixture of the fuel gas and the primary air, Pb represents a pressure of the secondary air, and Pc represents a pressure of the Venturi neck part through which the mixture passes.

Since the primary air and the secondary air are supplied by the same blower, the pressure of the mixture obtained by adding the fuel gas to the primary air is higher than that of the secondary air. That is, Pa is higher than Pb, and is equal to a pressure of the mixture passing through the mixture distribution hole 140.

Without the Venturi part, the mixture supplied to the auxiliary flame parts 120 can flow out toward the secondary air channel whose pressure is lower than its pressure through the secondary air inflow holes 151, because Pa is higher than Pb. As a result, unstable combustion takes place.

In the present invention, to solve this problem, the Venturi part is formed to reduce the pressure of the mixture, so that the mixture supplied to the auxiliary flame parts 120 can be prevented from flowing out toward the secondary air channel, and the secondary air can simultaneously be smoothly introduced into the Venturi part 150 via the secondary air inflow holes 151.

As described above, in the present invention, the Venturi part 150 is formed on the outer plate 103, so that it is possible to easily realize a burner having a lean-rich structure. Thus, the present invention has advantages of the reduction of the emission of the noxious gas and the stable combustion using a conventional lean-rich burner.

Figure 4:
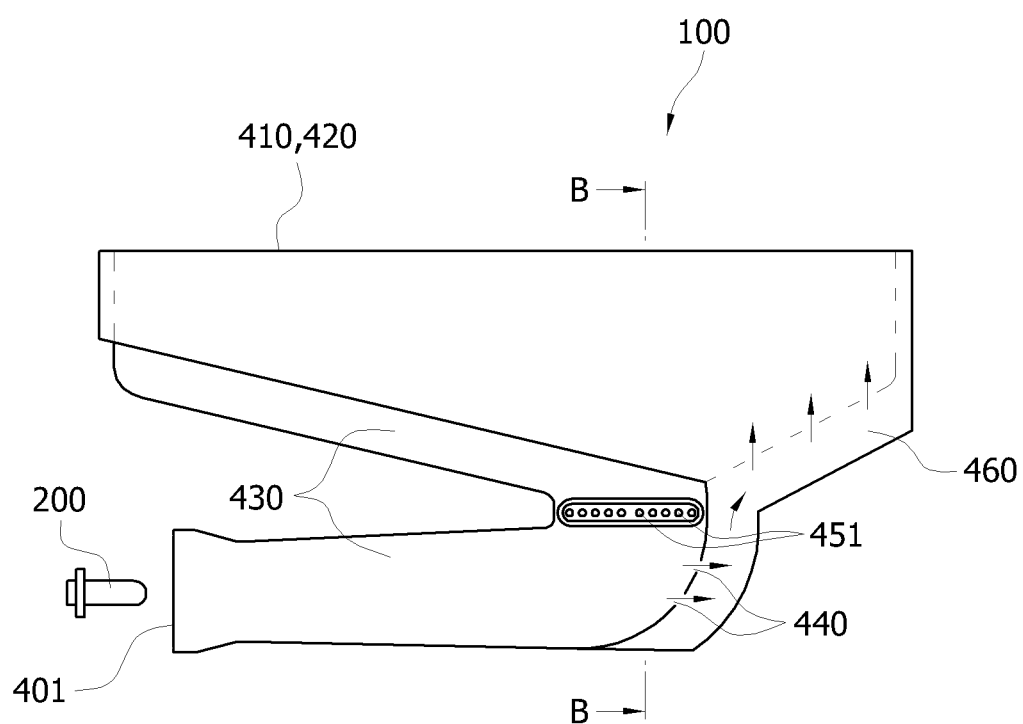
FIG. 4 is a front view showing a burner unit according to another embodiment of the present invention.
Figure 5:
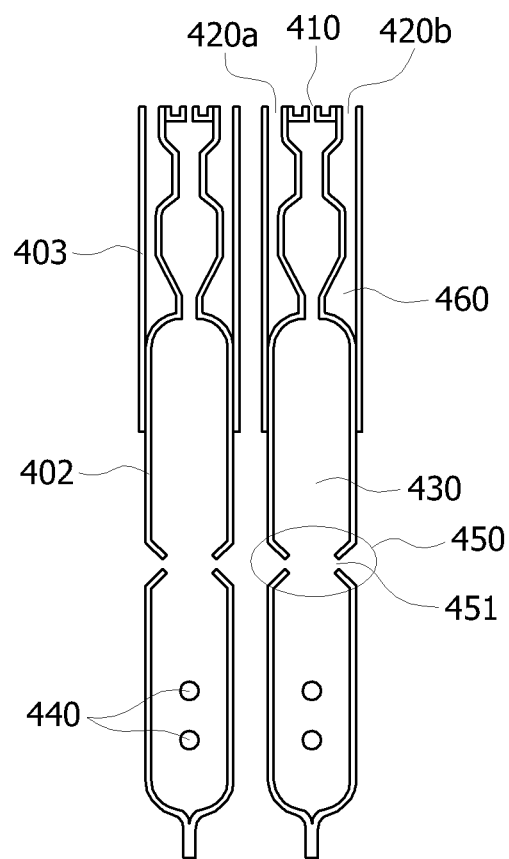
FIG. 5 is a cross-sectional view taken along line B-B of FIG. 4.

FIG. 4 is a front view showing a burner unit according to another embodiment of the present invention, and FIG. 5 is a cross-sectional view taken along line B-B of FIG. 4.

This embodiment is different from the embodiment of FIG. 2 in that an air-rich mixture is burnt at a main flame part 410 and a fuel-rich mixture is burnt at auxiliary flame parts 420.

Fuel gas injected by a nozzle 200 and primary air supplied from a blower are introduced together through a mixture inflow part 401. Some of the mixture flows along a main mixture channel 430, and is supplied to the main flame part 410. The rest of the mixture flows along an auxiliary mixture channel 460 via a mixture distribution hole 440 formed in the main mixture channel 430, and then is supplied to the auxiliary flame parts 420.

A Venturi part 450 having a Venturi structure in which secondary air inflow holes 451 for introducing secondary air supplied from the blower are formed is formed in the main mixture channel 430.

The secondary air inflow holes 451 perforate a main body 402. The secondary air is smoothly introduced into the main mixture channel 430 via the secondary air inflow holes 451 due to a pressure difference caused by the Venturi structure.

Due to this structure, the air-rich mixture is supplied to the main flame part 410 and the fuel-rich mixture is supplied to the auxiliary flame parts 420, so that a lean-rich burner structure is realized.

The main flame part 410 is provided with channel constriction brackets 470 for constricting an ejection channel of the mixture, and thus a flow rate of the mixture is increased in the event of low load, so that it is possible to prevent the flashback of a flame.

The invention claimed is:

1. A lean-rich burner comprising:
   a plurality of burner units (100a, 100b);
   an air distribution plate (300) installed on a lower portion of the plurality of burner units (100a, 100b) and formed a plurality of air holes (310);
   a secondary air channel (10) is formed between the plurality of burner units (100a, 100b);
   wherein each of the burner units (100a, 100b) comprising,
   a main body (102) in which a main mixture channel (130) through which a fuel-rich mixture flows is formed;
   a couple of outer plates (103) providing a channel of an air-rich mixture between an outer face of an upper side of the main body (102) and the couple of outer plates (103);
   an main flame part (110) formed at an upper end of the main body (102) for burning fuel-rich mixture;
   auxiliary flame parts (120) for burning the air-rich mixture on the left and right sides of the main flame part (110);
   wherein the fuel-rich mixture is formed from mixing a primary air supplied from a blower with a fuel gas and introduced through a mixture inflow part (101);
   where a secondary air supplied from the blower flows through the plurality of air holes (310) and then flows along the secondary air channel (10) in an upward directions;
   wherein mixture distribution holes (140) are formed by perforating the main body (102) located at inner side of the outer plate (103) to supply some of the fuel-rich mixture flowing along the main mixture channel (130) to the auxiliary flame parts (120);
   wherein a Venturi part (150) is formed on an upper portion of the mixture distribution holes (140) and formed by deforming the outer plate (103) concavely;
   wherein secondary air inflow holes (151) are formed by perforating the outer plate (103) of the Venturi part (150);
   wherein the secondary air in introduced through the secondary air inflow holes (151) and then mixed with the mixture flowing along the channel of the air-rich mixture.

2. The lean-rich burner according to claim 1, wherein a protrusion 102b) is formed above an edge of the mixture distribution hole (140) by protruding the main body (102) so as to induce the supply of the mixture to the auxiliary flame parts (120).

3. The lean-rich burner according to claim 1, wherein an enlarged part (160) is formed between the Venturi part (150) and the mixture distribution hole (140) so that a pressure of the mixture is reduced.

* * * * *